US005494072A

United States Patent [19]
Schinowsky

[11] Patent Number: 5,494,072
[45] Date of Patent: Feb. 27, 1996

[54] VALUE DEVICE ASSEMBLY AS A CONNECTION UNIT FOR DIFFERENTIAL PRESSURE TRANSDUCERS

[76] Inventor: Helmer Schinowsky, Genshagener Strasse 14, D-14979 Grossbeeren, Deutschland, Germany

[21] Appl. No.: 399,484

[22] Filed: Mar. 7, 1995

[30] Foreign Application Priority Data

Mar. 8, 1994 [DE] Germany ............... 44 07 609.6

[51] Int. Cl.$^6$ ................................ F16K 11/18
[52] U.S. Cl. ............. 137/597; 73/201; 137/599.1
[58] Field of Search ................ 137/597, 599.1, 137/545; 73/861.61, 201

[56] References Cited

U.S. PATENT DOCUMENTS

| | | | |
|---|---|---|---|
| 2,169,043 | 8/1939 | Goehring | 137/599.1 |
| 2,748,800 | 6/1956 | Allen | 73/201 X |
| 3,381,532 | 5/1968 | Tausch . | |
| 3,431,935 | 3/1969 | Bowditch . | |
| 3,596,680 | 8/1971 | Adams | 137/597 X |
| 4,304,259 | 12/1981 | Brunner | 137/599.1 |
| 4,879,912 | 11/1989 | Suckow | 137/597 X |

FOREIGN PATENT DOCUMENTS 1775195  7/1971  Germany .................. 137/597

*Primary Examiner*—Stephen M. Hepperle
*Attorney, Agent, or Firm*—Barnes & Thornburg

[57] ABSTRACT

This valve device assembly, which serves as a connection unit for a differential pressure transducer and is protected against false operation, has a first and a second inlet-end connection for connection to a differential pressure source, a first and a second outlet-end connection for connection to the differential pressure transducer, a first and a second chamber each with a valvelike shutoff device disposed therein, a first passage connecting the first chamber with the first outlet-end connection, a second passage connecting the first chamber with the second outlet-end connection, a third passage connecting the second chamber with the second outlet-end connection, and a fourth passage connecting the second chamber with the first outlet-end connection. In first end positions, the shutoff devices close the inlet-end connections. After one of the shutoff devices has been lifted from its end position, the pressure applied to the associated inlet-end connection is simultaneously applied to the two outlet-end connections. In further end positions, the shutoff devices close the second and fourth passages.

2 Claims, 1 Drawing Sheet

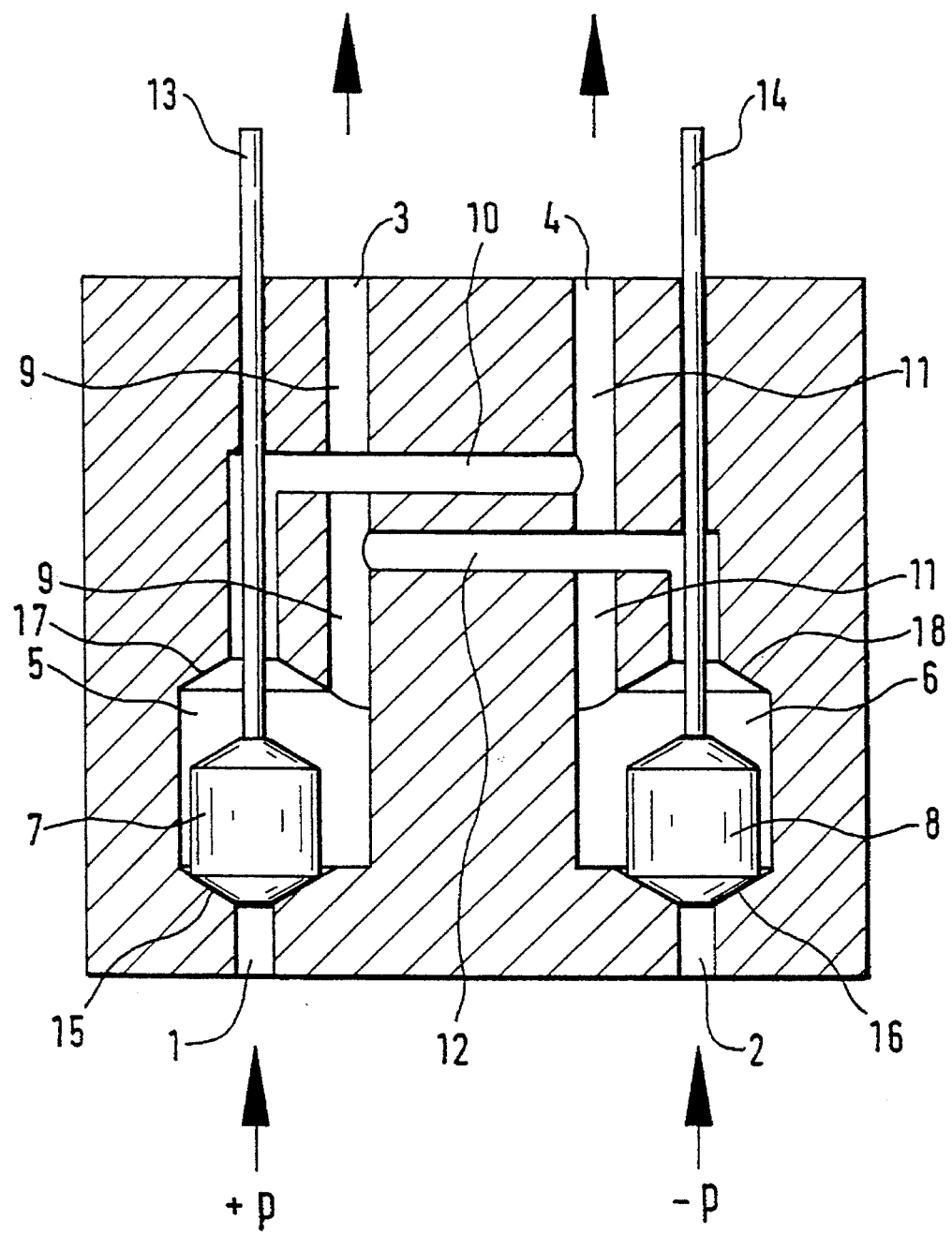

VALUE DEVICE ASSEMBLY AS A CONNECTION UNIT FOR DIFFERENTIAL PRESSURE TRANSDUCERS

FIELD OF THE INVENTION

The present invention relates to a valve device assembly as a connection unit for differential pressure transducers.

BACKGROUND OF THE INVENTION

Differential pressure transducers are commonly connected to a differential pressure source via a three-valve assembly. The three-valve assembly has to implement three functions. Firstly, it blocks the supply of the differential pressure, to permit the replacement of a faulty differential pressure transducer, for example; secondly, the three-valve assembly ensures that when the plant is put into operation, the usually very high static pressure is not applied to only one inlet of the differential pressure transducer, particularly of its measuring cell; and thirdly, the three-valve assembly serves to implement a short circuit by applying the same pressure to both inlets of the differential pressure transducer so that zero adjustment can be performed.

The commonly used three-valve assemblies have two inlet-end connections for connection to the differential pressure source and two outlet-end connections for connection to the differential pressure transducer. The two outlet-end connections are connected with one another via a short-circuit passage. Such a three-valve assembly contains three plain valves: A first inlet valve and a second inlet valve close the two inlet-end connections, and a third valve is disposed in the short-circuit passage.

A disadvantage of this three-valve assembly is that when the plant is put into operation, the three valves must be actuated in a particular sequence, for only if the third valve, i.e., the one in the short-circuit passage, is opened first will it be ensured that when one of the two inlet valves is opened, the pressure present at the respective inlet-end connection will be applied simultaneously to the two inlets of the differential pressure transducer. After both inlet valves have been opened, the valve in the short-circuit passage is closed and the measuring condition established.

If, as a result of an operating error, one of the two inlet valves is opened first, the full static pressure will be applied to only one inlet of the differential pressure transducer, in which case the transducer will not be destroyed only if protected by a highly efficient overload protection system. In the latter case, a disadvantage remains in that a (renewed) zero adjustment is generally inevitable.

In many practical applications, the requirement of sufficient overload protection for the differential pressure transducer can be fully met by the overload protection of the measuring cell. In those cases, the general requirement of increased overload protection, namely up to the full static pressure, is solely based on the above-explained errors in the operation of the three-valve assembly. Therefore, complicated and expensive overload protection devices are required, which unnecessarily add to the cost of the differential pressure transducer.

SUMMARY OF THE INVENTION

It is, therefore, the object of the invention to provide a valve device assembly which performs the same functions as conventional three-valve assemblies, and which does not permit the above-mentioned operating errors, i.e., which is protected against false operation.

To attain this object, the invention provides a valve device assembly serving as a connection unit for a differential pressure transducer, comprising:

a first inlet-end connection and a second inlet-end connection for connection to a differential pressure source;

a first outlet-end connection and a second outlet-end connection for connection to the differential pressure transducer;

a first chamber with a valvelike first shutoff device disposed therein;

a second chamber with a valvelike second shutoff device disposed therein;

a first passage connecting the first chamber with the first outlet-end connection;

a second passage connecting the first chamber with the second outlet-end connection;

a third passage connecting the second chamber with the second outlet-end connection; and a fourth passage connecting the second chamber with the first outlet-end connection, wherein the first shutoff device closes the first inlet-end connection in a first end position, and the second shutoff device closes the second inlet-end connection in a second end position;

after the first or second cutoff device has been lifted from the first or second end position, respectively, the pressure applied to the associated inlet-end connection is simultaneously applied to the two outlet-end connections; and the first shutoff device closes the second passage in a third end position, and the second shutoff device closes the fourth passage in a fourth end position.

In a preferred embodiment of the invention, the end positions are determined by respective truncated-cone-shaped sealing surfaces which fit corresponding truncated-cone-shaped sealing surfaces of the shutoff devices.

An advantage of the invention is that in contrast to the conventional three-valve assembly, only two shutoff devices are required, which, however, fulfill four shutoff functions. As a result, operating errors are no longer possible. It makes no difference which of the two shutoff devices is opened first when the plant is put into operation. In any case, the same pressure is applied to both inlets of the differential pressure transducer. Unilateral overloading as may occur with the conventional three-valve assembly if the valve in the short-circuit path is not opened first is impossible.

Suitable shutoff devices are all prior art valvelike devices which are capable of realizing the effects recited in claim 1, particularly a version similar to a three-way valve with truncated-cone-shaped sealing surfaces as claimed in claim 2.

An essential requirement for the use of the valve device assembly in conjunction with a differential pressure transducer without specific overload protection is a design of the shutoff devices which ensures that, when these devices are opened, the pressure-transmitting medium flows sufficiently slowly into the inlet chambers of the differential pressure transducer, so that even short-time overloads due to pressure surges are avoided.

BRIEF DESCRIPTION OF THE DRAWING

The invention will become more apparent from the following description of an embodiment taken in conjunction with the accompanying drawing, whose single figure is a schematic sectional view of a valve device assembly with two shutoff devices.

DETAILED DESCRIPTION OF THE DRAWING

The valve device assembly is made of a suitable material, such as a metal. On one side which faces toward a differential pressure source (not shown), it has a first inlet-end connection 1 and a second inlet-end connection 2, and on the opposite side, which faces toward a differential pressure transducer (not shown), it has a first outlet-end connection 3 and a second outlet-end connection 4.

The first inlet-end connection 1 and the second inlet-end connection 2 are connected to the high-pressure-side connection +p and the low-pressure-side connection –p, respectively, of the differential pressure source, e.g., a diaphragm. Similarly, the first outlet-end connection 3 is connected to the high-pressure-side connection of the differential pressure transducer, and the second outlet-end connection 4 to the low-pressure-side connection. Because of the symmetrical design of the valve device assembly, any reversal of the high-pressure and low-pressure sides will cause no damage.

The inlet-end connections 1 and 2 lead to first and second chambers 5 and 6, respectively. The first chamber 5 is connected with the first outlet-end connection 3 via a first passage 9, and with the second outlet-end connection 10 via a second passage 10. The second chamber 6 is connected with the second outlet-end connection 4 via a third passage 11, and with the first outlet-end connection 3 via a fourth passage 12. Thus, each of the chambers 5, 6 is also connected with the respective other pressure side.

Each chamber contains a valvelike shutoff device 7, 8. The shutoff device 7 is movable between a first end position 15 and a third end position 17 by means of a rotatable spindle 13, and the shutoff device 8 is movable between a second end position 16 and a fourth end position 18 by means of a rotatable spindle 14. In the first and second end positions 15, 16, the shutoff devices 7, 8 seal the chambers 5, 6 hermetically from the differential pressure source, this shutoff position of the shutoff devices being shown in the figure. In the third and fourth end positions 17, 18, the shutoff devices 7, 8 seal the chambers 5, 6 hermetically from the differential pressure transducer.

In the latter end positions, however, the first shutoff device 7 disconnects the second passage 10, and thus the second outlet-end connection 4, from the first chamber 5, and conversely, the second shutoff device 8 disconnects the fourth passage 12, and thus the first outlet-end connection 3, from the second chamber 6. Thus, cross connections implemented by the passages 10, 12 are blocked.

To ensure reliable sealing, the end positions 15, 16, 17, 18 are preferably determined by truncated-cone-shaped sealing surfaces to which corresponding truncated-cone-shaped sealing surfaces of the shutoff devices are adapted.

The operation of the valve device assembly according to the invention is as follows. When the two shutoff devices 7, 8 are in the end positions 15, 16 shown in the figure, the differential pressure transducer is disconnected from the differential pressure source and can be removed, e.g., for maintenance work or for replacement. Also, in this position of the shutoff devices 7, 8, repair work can be performed in a plant in which the valve device assembly and the differential pressure transducer are installed.

If, when the plant is put into operation or after completion of such work, the shutoff devices 7, 8 are opened in arbitray order by rotating the respective spindles 13, 14, the pressure-transmitting medium will flow through the chambers 5, 6 and the passages 9, 11 and 10, 12 to the outlet-end connections 3, 4, and from there to both inlet chambers of the differential pressure transducer.

However the valve device assembly is operated, the possibility of pressure being applied to only one inlet of the differential pressure transducer and possibly destroying the latter is ruled out.

When one shutoff device, e.g., 7, is open, i.e., in a position between its two end positions 15, 17, and the other shutoff device, i.e., 8, is still in end position 16, a valve condition is reached in which a zero adjustment of the differential pressure transducer can be performed, for example, since the same pressure acts on both sides of the transducer.

By continued rotation of the spindles 13, 14, the shutoff devices 7, 8 are moved to their end positions 17, 18, in which the two passages 10, 12 are closed. In this position, the normal measuring condition, in which pressure is transmitted from the inlet-end connections 1, 2 to the outlet-end connection 3, 4, has been (re)established.

I claim:

1. A valve device assembly serving as a connection unit for a differential pressure transducer, comprising:

a first inlet-end connection and a second inlet-end connection for connection to a differential pressure source;

a first outlet-end connection and a second outlet-end connection for connection to the differential pressure transducer;

a first chamber with a valvelike first shutoff device disposed therein;

a second chamber with a valvelike second shutoff device disposed therein;

a first passage connecting the first chamber with the first outlet-end connection;

a second passage connecting the first chamber with the second outlet-end connection;

a third passage connecting the second chamber with the second outlet-end connection; and a fourth passage connecting the second chamber with the first outlet-end connection, wherein the first shutoff device closes the first inlet-end connection in a first end position, and the second shutoff device closes the second inlet-end connection in a second end position;

after the first or second cutoff device has been lifted from the first or second end position, respectively, the pressure applied to the associated inlet-end connection is simultaneously applied to the two outlet-end connections; and the first shutoff device closes the second passage in a third end position, and the second shutoff device closes the fourth passage in a fourth end position.

2. A valve device assembly as claimed in claim 1 wherein the end positions are determined by respective truncated-cone-shaped sealing surfaces which fit corresponding truncated-cone-shaped sealing surfaces of the shutoff devices.

* * * * *